US006529746B1

United States Patent
Kotzin

(10) Patent No.: US 6,529,746 B1
(45) Date of Patent: Mar. 4, 2003

(54) WIRELESS DEVICE CRADLE WITH SPATIAL ANTENNA DIVERSITY CAPABILITY

(75) Inventor: Michael D. Kotzin, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 32 days.

(21) Appl. No.: 09/676,904

(22) Filed: Oct. 2, 2000

(51) Int. Cl.[7] .................................................. H04B 1/38
(52) U.S. Cl. ...................... 455/562; 455/101; 455/277.1
(58) Field of Search ................... 455/561, 562, 455/101, 352, 132, 193.1, 272, 273, 277.1, 277.2, 575, 90, FOR 121; 379/454, 455; 343/702; H01Q 1/30, 1/32

(56) References Cited

U.S. PATENT DOCUMENTS

| | | | | |
|---|---|---|---|---|
| 4,803,447 A | * | 2/1989 | Schultz et al. ............... 333/103 |
| 5,056,153 A | * | 10/1991 | Taniguchi et al. .......... 455/556 |
| 5,261,121 A | * | 11/1993 | Hashimoto ................... 455/89 |
| 5,754,962 A | * | 5/1998 | Griffin ......................... 455/569 |
| 5,852,651 A | * | 12/1998 | Fischer et al. ............. 379/56.2 |
| 5,898,908 A | * | 4/1999 | Griffin et al. ............... 455/127 |
| 5,991,613 A | * | 11/1999 | Euscher et al. .......... 455/277.1 |
| 6,067,449 A | * | 5/2000 | Jager ........................ 455/277.2 |
| 6,072,993 A | * | 6/2000 | Trikha et al. ................. 455/78 |
| 6,091,758 A | * | 7/2000 | Ciccone et al. ............. 375/132 |

OTHER PUBLICATIONS

U.S. Application Ser. No. 09/614,161 filed Jul 11, 2000, Motorola, Inc., Michael D. Kotzin.

* cited by examiner

Primary Examiner—William Cumming
Assistant Examiner—Lana Le
(74) Attorney, Agent, or Firm—Paul J. Bartusiak; Randall S. Vaas; Lawrence J. Chapa

(57) ABSTRACT

A cradle for a wireless device such as a cellular telephone. The cradle provides a second antenna for antenna diversity operation of the wireless device. Optionally, the cradle contains any of hardware circuitry, processing, and software to provide antenna diversity operation in conjunction with the wireless device.

17 Claims, 2 Drawing Sheets

WIRELESS DEVICE CRADLE WITH SPATIAL ANTENNA DIVERSITY CAPABILITY

BACKGROUND OF THE INVENTION

The present invention relates to the cellular communication arts. It finds particular application in conjunction with a wireless device cradle with spatial antenna diversity capability.

A cellular communication system is a type radio communication system in which communication (i.e. voice and/or data) is permitted with a radio transceiver positioned at any location within a geographic area encompassed by the cellular communication system. A cellular communication system is created by positioning a plurality of fixed-site radio transceivers, referred to as base stations or base sites, at spaced-apart locations throughout a geographic area. The base stations are connected to a conventional, wireline telephonic network such as a Public Switched Telephone Network (PSTN). Associated with each base station of the plurality of base stations is a portion of the geographic area encompassed by the cellular communication system. Such portions are referred to as cells. Each of the plurality of cells is defined by one of the base stations of the plurality of base stations, and the plurality of cells together define the coverage area of the cellular communication system.

A radio transceiver, referred to in a cellular communication system as a cellular radiotelephone or, more simply, a cellular phone, positioned at any location within the coverage area of the cellular communication system, is able to communicate (i.e. voice and/or data) with a user of the conventional, wireline, telephonic network by way of a base station. Modulated carrier signals generated by the radiotelephone are transmitted to a base station, and modulated carrier signals generated by the base station are transmitted to the radiotelephone, thereby to effectuate two-way communication. A signal received by a base station is then transmitted to a desired location of a conventional, wireline network by conventional telephony techniques. Signals generated at a location of the wireline network are transmitted to a base station by conventional telephony techniques, and the base station then transmits the signals to the remote radiotelephone.

In a digital cellular system, a transmitter, converts the communication signal into a digital code that is modulated and then transmitted upon the communication channel. Ideally a signal received by the receiver of a radiotelephone is identical with that of the signal transmitted by the transmitter of the base station. However, the signal actually received by the receiver is not a single signal but rather the summation of signals that have propagated along different paths.

For example, a signal transmitted by the transmitter may be reflected off of both man-made or natural objects prior to reception by the receiver, and signals transmitted upon such paths are received by the receiver, delayed in time relative to signals transmitted upon the shortest-distance paths. This multiplicity of transmission paths is referred to as a multipath signals, and the signal received by the receiver is a summation of the plurality of the multipath signals.

Because signals transmitted along other than the shortest-distance transmission paths arrive at the receiver delayed in time relative to the signal transmitted along the shortest-distance transmission path, late-arriving signals interfere with previously arrived signals. When the signal transmitted by the transmitter comprises the modulated, digital code, such interference is referred to as intersymbol interference. When such intersymbol interference is significant, a received signal cannot be faithfully recovered by a remote receiver.

Receivers have been constructed which have two or more spaced-apart antennas for receiving signals transmitted thereto. It is known that the larger the spacing between antennas, the more decorrelated are the received signals. When two or more antennas are configured in such manner, the antennas are referred to as being in diversity (or, diversity antennas), and a receiver including such antennas configured in diversity are referred to as diversity receivers. Transceivers including such antennas are referred to as diversity transceivers.

The signals received at one or the other of the two or more spaced-apart antennas are utilized by circuitry of the receiver to recover the signal actually transmitted by the transmitter. The antennas are positioned in relative orientations such that when a signal received at one of the antennas includes significant interference or is weak, a signal received at another of the antennas includes, typically, a lesser amount of interference (or may be of a greater signal strength). This is because of the different propagation paths signals travel in reaching the two antennas.

Although the path from a transmitter to one of the two remote antennas may cause signal phase cancellation that results from different signal paths, it is less probable that multiple paths to the other antenna will cause phase cancellation at the same time. The probability that the two antennas are receiving exactly the same signal is called a correlation factor.

Wireless subscriber devices have inherent limitations due to their small size. The radio performance tends to be poor because their small size hinders the use of such spatial antenna diversity techniques—both from the aspect of having the size to provide the electronics for the multiple receiver paths, and providing enough physical separation of the multiple antennas to achieve any improvement. There is also an issue of increased cost. These limitations contribute to not being able to provide very high data rates that are demanded by future 3G (third generation) services and applications. It also prevents the cellular network operator from meeting range and capacity expectations of the deployed system.

Accordingly, it is desirable to develop a new and improved wireless device with spatial reception and/or transmit antenna diversity capability.

DETAILED DESCRIPTION OF THE INVENTION

Figure 1:
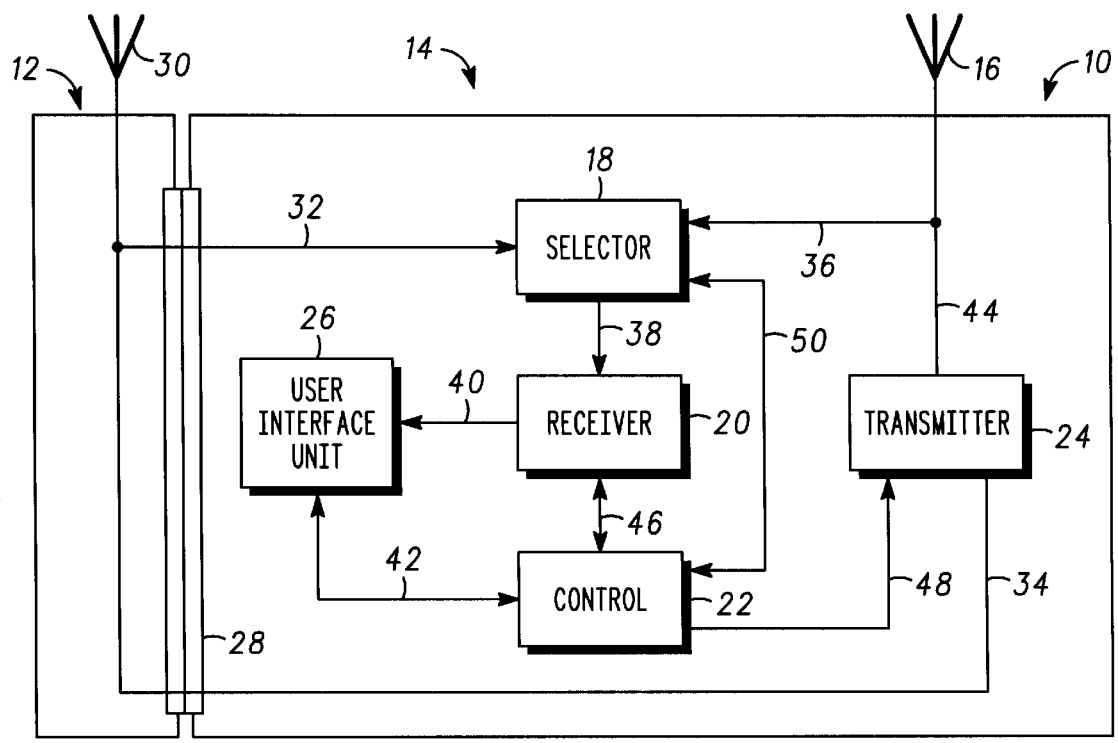
FIG. 1 is a functional block diagram of a wireless device and a wireless device cradle configured as a diversity reception and/or transmit apparatus in accordance with the present invention.

Known diversity reception systems include switched antenna diversity (SAD), selection diversity (SD), maximal ratio combining diversity (MRCD), and equal gain combining diversity (EGCD). The methodologies for employing these diversity reception techniques are equally known. Thus, only a brief summary of each diversity reception technique is provided below. Each diversity reception system includes a controller having an algorithm programmed therein for controlling that particular type of diversity reception system.

Briefly, in switched antenna diversity (SAD) systems, two antennas are coupled to a single receiver through a single pole, double throw radio frequency (RF) switch. A controller samples the signal received from each antenna to couple only one of the two antennas to the receiver at a time. The signal from one of the antennas can be monitored by a conventional signal quality measuring device and/or a conventional signal accuracy measuring device. An exemplary signal quality measuring device measures the signal to interference ratio (C/I), or the signal-to-noise and interference (C/N+I) ratio. An exemplary signal accuracy measuring device is used to perform a cyclic redundancy check (CRC) on the received signal. However, other quality and accuracy exist which may be substituted for those described above. For example, a received signal strength indicator (RSSI) of the type which produces a signal proportional to the logarithm of the incoming signal can be utilized for one or both of the above parameters, along with bit error rate (BER), and frame erasure rate, also referred to as frame error rate (FER). By way of example only, if a received signal strength indicator (RSSI) indicates a strength below a preselected minimum threshold level, the scan circuitry switches to the other antenna.

In selection diversity (SD) systems, two antennas and two receivers are employed, and each antenna is coupled to its own receiver. The receiver with the highest baseband signal to noise ratio (SNR) is selected to be the demodulated signal. Selection diversity (SD) provides improved performance over switched antenna diversity (SAD) because the signals produced by the receivers can be monitored more often than with switched antenna diversity (SAD) and suffer fewer switching transients. However, one cost associated with both switched antenna diversity (SAD) and selection diversity (SD) is that only one antenna is used at any instant in time, while the other is disregarded.

In maximal ratio combining diversity (MRCD) systems, two antennas and two receivers are employed, and each antenna is coupled to its own receiver. MRCD exploits the signals from each antenna by i) weighting the signals in proportion to their respective signal-to-noise ratios (SNRs), ii) properly adjusting the relative phase, and iii) summing the signals weighted by their respective powers. That is, in a maximal ratio combining diversity (MCRD) system, the signals from all of the diversity branches are weighted according to their individual signal voltage to noise power ratios and then summed. Accordingly, the individual signals in each diversity branch are cophased and combined, exploiting all the received signals, even those with poor SNRs. In particular, the two incoming diversity signals at the two spaced antennas are first squared to derive weighting signals. The incoming signals are put in relative phase with one another, or co-phased, through a regenerative feedback circuit or the like. The two co-phased incoming signals are then combined in proportion to their relative weights to produce an output signal proportional to the power of the incoming signals. One cost associated with an MRCD system is that it is more complicated to operate compared to the SAD and SD systems.

Equal gain combining diversity (EGCD) systems operate substantially the same as the maximal ratio (MRCD) systems described above, except that the incoming signals are not first squared. Thus, the signals are not weighted. That is, the branch weights are all set to unity but the signals from each branch are co-phased and then combined to provide equal gain combining diversity. The selected outputs from these two combiner types of diversity systems are generally applied to an FM demodulator or other similar circuit to obtain or derive the informational content from the composite signal produced by the diversity system.

With reference now to FIG. 1, there is shown a simplified block diagram of an exemplary wireless device 10 that is removably mounted to, and in electrical communication with, a wireless device cradle 12 of the present invention. The wireless device 10 can be, or can be coupled to or otherwise in communication with, a telephone, a cable telephony interface device, a cellular or PCS radiotelephone, a cordless radiotelephone, a radio, a personal digital assistant (PDA), a pager, a palm-top computer, a personal computer, etc. Accordingly, as used herein, wireless device refers to each of these devices and their equivalents.

The wireless device 10 and cradle 12 are configured to operate as a switched antenna diversity (SAD) apparatus 14 in a radio system. The term radio system is intended to generally describe any communication system operating over RF channels. Radio systems intended to be included within the scope of the present invention include, by example, cellular radiotelephone communication systems, two-way radio communication systems, and personal communication systems (PCS).

In the preferred embodiment, the radio system is a cellular radiotelephone communication system. Types of cellular radiotelephone communication systems intended to be within the scope of present invention include, by example, Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, and Extended-TDMA (E-TDMA) cellular radiotelephone systems. GSM systems have been adopted across Europe and in many countries for the Pacific rim. GSM uses 200 kHz channels with 8 users per channel using TDMA, and has a vocoder rate of 13 kbits/s. NADC systems use 30 kHz channels, three users per channel, and have a vocoder rate of 8 kbits/s. E-TDMA also uses 30 kHz channels, but has 6 users per channel with a vocoder rate of 4 kbits/s.

The wireless device 10 includes an antenna 16 here referred to as the primary antenna, an antenna selector 18, a receiver 20, a controller or processor 22, a transmitter 24, and a user interface (i.e. speaker and/or microphone) 26. While shown as discrete circuits, in practice, the receiver 20 and transmitter 24 can be integrated as a conventional transceiver circuit. The wireless device 10 is mechanically and electrically coupled to or mated with the cradle 12 through a connector assembly 28. It is contemplated that any conventional connector assembly can be employed to mechanically and/or electrically couple the wireless device to the cradle. Further, it is contemplated that at least portions of the various wireless device subassemblies such as the selector 18, processor 22, transmitter 24, user interface components 26, etc., can reside in the cradle 12.

The cradle 12 includes at least one auxiliary or diversity antenna 30 coupled to the antenna selector 18 at line 32 through the connector assembly 28. It is recognized that the diversity antenna 30 can include known filtering and/or amplifier circuitry that establishes a noise floor of the diversity antenna and facilitates coupling the diversity antenna 30 to the wireless device 10. Optionally, the diversity antenna 30 can be coupled to the transmitter at line 34 through the connector assembly 28 in order to provide transmit diversity use including phased array, smart, and adaptive transmit diversity techniques. These transmit diversity techniques are well-known and described in the prior art including K. Rohani, M. Harrison, and K. Kuchi, "A Comparison of Base Station Transmit Diversity Methods for Third Generation Cellular Standards," Proc. IEEE Veh. Tech. Conf., pp. 351–355, Houston, Tex., May 1999; L. Jalloul, K. Rohani, K. Kuchi, and J. Chen "Performance Analysis of CDMA Transmit Diversity Methods," Proc. IEEE Veh. Tech. Conf., Fall 1999; and K. Rohani, "Open Loop Transmit Diversity for CDMA Forward Link," IEEE Emerging Technologies Symposium, Dallas, Tex., Apr. 10–11, 2000, all three of which are incorporated herein by reference.

The block diagram of the switched antenna diversity system 14, and in particular, the wireless device 10 and the cradle 12, is simplified in order to facilitate the understanding of the present invention. Practically, the wireless device 10 and/or cradle 12 also includes many other blocks and connections, as is well known to those skilled in the art. For instance, the receiver 20 generally includes a demodulator, an intermediate frequency (IF) processor and may include a received signal strength (RSSI) determiner, etc. Further, the cradle 12 can include a conventional power supply for powering the switched antenna diversity system, and in particular, externally powering the wireless device 10.

In addition, the cradle 12 can include a wired or wireless (e.g. short range, spread spectrum, localized network) external data port and associated circuitry (serial, USB, etc.) that permits the wireless device and cradle to exchange information with a separate, remote device (e.g. a computer or PDA) which is then transmitted via the switched antenna diversity apparatus 14 across the cellular communication system ( and vice versa). Thus, the wireless device 10 includes a first transceiver for communicating, via a first communication link (e.g. a cellular telephone link, a paging link) with a remote base station. The cradle 12 has an external data port to permit the wireless device 10 to exchange data with a remote device via a second communication link, where the second communication link is defined by a different data exchange protocol than the first communication link. This second data exchange protocol can be, for example, a short range communication link that complies with the BLUETOOTH short-range wireless standard outlined in "Specification of the BLUETOOTH System," volume 1, Core (e.g. v1.0B, Dec. 1, 1999), and volume 2, Profiles (v1.0B, Dec. 1, 1999), incorporated herein by reference.

In the preferred embodiment, the antennas 16 and 30 are half-wave dipole type antennas. However, it is contemplated that the antenna 16 and/or the antenna 30 can be any other suitable type of antenna including a loop type, a patch type, or a monopole antenna. When receiving a modulated signal transmitted to diversity apparatus 14, antenna 16 is operative to receive such transmitted signal and to convert such transmitted signal into an electrical signal on line 36. Antenna 30 is similarly operative to receive such transmitted signal and to convert such transmitted signal into an electrical signal on line 32.

Lines 32 and 36 are coupled to the selector 18. In the preferred embodiment, the selector 18 is an electronic device such as a multiplexor circuit, or one or more field effect transistors (FETs) configured as a single-throw, double-pole switch. In addition, the selector 18 may be embodied as a plurality of attenuators controlled by a control signal on line 50. A typical attenuation value that may be used for the attenuators is 20 dB. Depending upon the position of the selector 18, either line 32 or line 36 is coupled to line 38, to supply the signal generated on line 32 or the signal generated on line 36 to receiver circuitry 20. Receiver circuitry 20 is operative, typically, to down-convert in frequency the signal applied thereto, to demodulate the down-converted signal, to decode such demodulated signal, and to supply the decoded signal by way of line 40 to a transducer, here speaker 26.

A transmit portion of the wireless device 10 includes a transducer, here microphone 26 which generates an electrical signal on line 42 which is supplied to transmitter circuitry 24 via the processor 22. Transmitter circuitry 24 is operative in a manner analogous to, but reverse to that of, receiver circuitry 20 and is operative to generate a modulated signal on line 34 which is coupled to antenna 30 and/or line 44 which is coupled to antenna 16 to permit transmission of a modulated signal therefrom. Alternatively, the transmitter 24 can generate a modulated signal which is coupled to either or both antenna 30 and antenna 16 by way of the selector 18 to permit transmission of a modulated signal.

The processor 22 is operative to control the operation of the receiver circuitry 20 by way of control and/or signal lines 46, the transmitter circuitry 24 by way of the control and/or signal lines 48, and the selector circuitry 18 by way of control and/or signal lines 50. Further, the processor 22 contains appropriate control algorithms to determine from which antenna, antenna 16 or antenna 30, that a received signal is to be applied to receiver circuitry 20. In one embodiment of the present invention, such control algorithm (s) is operative to cause positioning of selector 18 to permit conventional quality and/or accuracy sampling by receiver circuitry 20 of signals received by the antenna 16 and the antenna 30. Responsive to such sampling, a determination is made as to which of the antennas is to be coupled to receiver circuitry 20.

The line 36 and the line 32 and associated circuitry are commonly referred to as diversity branch 1 and diversity branch 2, respectively. The controller 22 is generally a microcomputer such as a microprocessor or a digital signal processor (DSP). The controller 22 may be, for example, a MC68332 microcontroller or a MC56156 DSP manufactured and available from Motorola, Inc. The controller 22 is typically separate from the receiver 20. However, the controller 22 and the receiver 20 may be combined to form an integral unit, such as an integrated circuit (IC).

By way of example only, one measure of the quality of the received signal is the signal or carrier to interference ratio (C/I). A carrier-to-noise and interference (C/(N+I)) ratio may also be used. A measure of the accuracy of the received signal is a cyclic redundancy check (CRC) on the received signal. It will be understood by those skilled in the art, however, that there exist other quality and accuracy parameters which may be substituted for those described above. For example, received signal strength indicator (RSSI), integrated RSSI, bit error rate (BER), and frame erasure rate, also referred to as frame error rate (FER), a ratio (Ec/Io) of the pilot power (Ec) of a pilot signal to all received signal power (Io), etc. may all be used as one of the sampled or calculated parameters.

In the preferred embodiment, the switched antenna diversity receiver apparatus 14 has two antennas 16 and 30. However, more than two antennas may be incorporated into the diversity receiver apparatus 14 as is well known to those skilled in the art. The proper location, spacing, orientation, etc., of the first antenna 16 and the second antenna 30 is well known to one of ordinary skill in the art. It should be appreciated that because of the spatial relationship of the first antenna 16 and the second antenna 30, the RF signal received at one antenna may be both delayed and attenuated with respect to the RF signal received at the other antenna. The switched antenna diversity receiver apparatus 14 takes advantage of these differences in order to improve the reception of the radio subscriber unit 10.

Examples of switched antenna diversity (SAD) systems that are suitable for use with the present invention are disclosed in U.S. Pat. Nos. 6,018,651 and 5,446,922, which are assigned to the Assignee of the present invention, and which are incorporated herein by reference.

Figure 2:
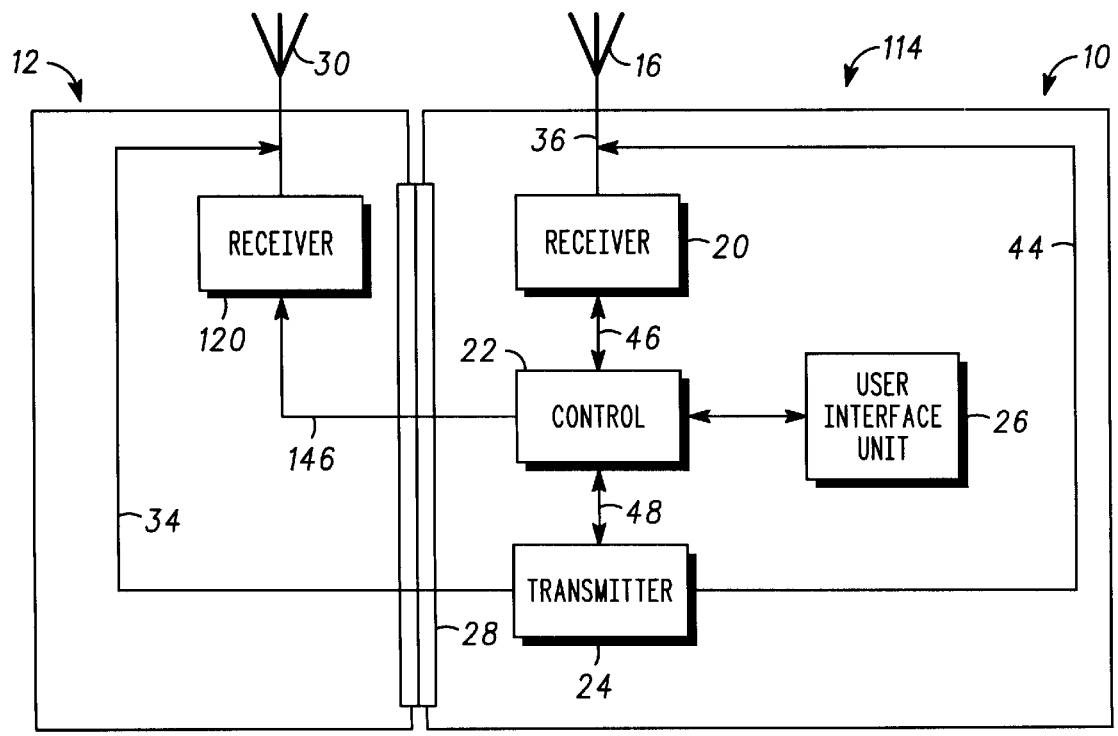
FIG. 2 is a functional block diagram of a second embodiment of a wireless device and a wireless device cradle configured as a diversity reception and/or transmit apparatus in accordance with the present invention.

FIG. 2 illustrates a block diagram of a second embodiment of the present invention. Generally, the second embodiment in FIG. 2 is the same as the first embodiment of FIG. 1 except that the diversity transceiver apparatus of FIG. 2 is one of a selection diversity (SD) apparatus, a maximal ratio combining diversity (MRCD) apparatus, or an equal gain combining diversity (EGCD) apparatus 114. Thus, all common or substantially common elements between FIG. 1 and FIG. 2 are labeled with the same reference numbers and no further description will be given for those reference numbers.

FIG. 2 is presented to illustrate that the same diversity principles illustrated in the switched antenna diversity receiver apparatus 14 of FIG. 1, also apply to the selection diversity (SD) apparatus, maximal ratio combining diversity (MRCD) apparatus, or equal gain combining diversity (EGCD) apparatus 114 of FIG. 2.

The diversity apparatus 114 generally includes the wireless device 10 that is removably mounted to, and in electrical communication with, the wireless device cradle 12. The wireless device 10 includes the primary antenna 16, the receiver 20, controller or processor 22, transmitter 24, and user interface (i.e. speaker and/or microphone) 26. The wireless device 10 is mechanically and electrically coupled to the cradle 12 through the connector assembly 28. It is contemplated that at least portions of the various wireless device subassemblies such as the receiver 20, processor 22, transmitter 24, user interface components 26, etc., can reside in the cradle 12. Likewise, it is further contemplated that at least portions of various cradle subassemblies such as the receiver 120 can reside wholly, or at least partially, in the cradle 12 (see, e.g., the alternate embodiment of FIG. 3 discussed further below).

The cradle 12 includes the auxiliary or diversity antenna 30 coupled to receiver circuitry 120 associated with the cradle 12. Optionally, the diversity antenna 30 can be coupled to the transmitter 24 at line 34 through the connector assembly 28 in order to provide transmit diversity use including phased array, smart, and adaptive transmit diversity techniques.

The block diagram of the switched antenna diversity system 114, and in particular, the wireless device 10 and the cradle 12, is simplified in order to not unduly complicate the drawing figure. For example, the wireless device 10 and/or cradle 12 also includes many other blocks and connections, as is well known to those skilled in the art. Thus, the receivers 20 and 120 each generally include a demodulator, an intermediate frequency (IF) processor and may include a received signal strength (RSSI) determiner, etc. Further, the cradle 12 can include a conventional power supply for powering the diversity system 114. In addition, the cradle 12 can include a wired or wireless (e.g. short range, spread spectrum, localized network) external data port and associated circuitry (serial, USB, etc.) that permits the wireless device and cradle to exchange information with a separate, remote device (e.g. a computer or PDA) which is then transmitted via the switched antenna diversity apparatus 14 across the cellular communication system ( and vice versa).

When receiving a modulated signal transmitted to the diversity apparatus 114, antenna 16 is operative to receive such transmitted signal and to convert such transmitted signal into an electrical signal on line 36 as input to the receiver 20. Antenna 30 is similarly operative to receive such transmitted signal and to convert such transmitted signal into an electrical signal on line 132 as input to the diversity receiver 120.

The transmit portion of the wireless device 10 includes a transducer, here microphone 26 which generates an electrical signal on line 42 which is supplied to transmitter circuitry 24 via the processor 22. Transmitter circuitry 24 is operative in a manner analogous to, but reverse to that of, receiver circuitry 20, 120 and is operative to generate a modulated signal on line 34 which is coupled to antenna 30 and/or line 44 which is coupled to antenna 16 to permit transmission of a modulated signal therefrom.

The processor 22 is operative to control the operation of the receiver circuitry 20 by way of control and/or signal lines 46, the receiver circuitry 120 by way of control and/or signal lines 146, and the transmitter circuitry 24 by way of the control and/or signal lines 48. In the case of a selection diversity (SD) apparatus, the processor 22 contains appropriate control algorithm(s) embodied therein to determine which diversity branch received signal is to be demodulated and passed to the user interface subassembly 26 namely, diversity branch 1 through antenna 16 and receiver 20, or diversity branch 2 through antenna 30 and receiver 120. In the case of a maximal ratio combining diversity (MRCD) apparatus, or an equal gain combining diversity (EGCD) apparatus, the processor 22 contains appropriate control algorithm(s) embodied therein to combine the signals received by the first and second diversity branches in accordance with the requirements of that particular type of diversity apparatus.

Further in the case of a selection diversity (SD) apparatus, the controller is operative to receive signals such as RSSI signals, integrated RSSI signals, ratio of Ec/Io signals, and the demodulated signals, etc. on control and/or signal lines 46 in order to determine which diversity branch signal is to be passed to the user interface subassembly 26. An example of a selection diversity (SD) system that is suitable for use with the present invention is disclosed in U.S. Pat. No. 6,023,615, which is assigned to the Assignee of the present invention, and which is incorporated herein by reference.

As previously indicated, another conventional technique for coherently combining the antenna RF signals from a space-diversity antenna array (i.e. the antennas 16, 30) is equal gain combining diversity (EGCD). Exemplary equal-gain pre-detection diversity combiners are those described in an article by D. Brennan entitled, "Linear Diversity Combining Techniques", published by IRE Proceedings, June 1959, at pp. 1075 to 1101 and in U.S. Pat. No. 3,471,788 to W. S. Bickford et al, both incorporated herein by reference.

In these combiners, the antenna signals are converted to intermediate frequency (IF) signals which are then co-phased with one another and then linearly combined to provide a composite IF signal. For example, the IF signals developed from each antenna RF signal may be phase aligned with a locally generated signal of a reference frequency, or may be phase aligned to a selected one of the IF signals, or may be phase aligned with respect to the composite IF signal. Once the IF signals from each antenna RF signal are co-phased with one another, they may then be linearly added by appropriate circuitry to provide a coherent composite IF signal which is the vector sum of the individual IF signals.

In the preferred embodiment, the switched antenna diversity receiver apparatus 114 has two antennas 16 and 30. However, more than two antennas may be incorporated into the diversity receiver apparatus 114 as is well known to those skilled in the art. The proper location, spacing, orientation, etc., of the first antenna 16 and the second antenna 30 is well known to one of ordinary skill in the art. It should be appreciated that because of the spatial relationship of the first antenna 16 and the second antenna 30, the RF signal received at one antenna may be both delayed and attenuated with respect to the RF signal received at the other antenna. The switched antenna diversity receiver apparatus 114 takes advantage of these differences in order to improve the reception of the radio subscriber unit 10.

Thus, one result of combining the wireless device 10 with the wireless device cradle 12 in accordance with the present invention is to provide a diversity reception apparatus that reduces the degrading effect of the large variations in signal strength that is characteristic of multipath fading. In the case of a switched antenna diversity (SAD) or selection diversity (SD) apparatus, this is accomplished by selecting the best antenna for reception, until another antenna becomes better. The effect is that the active antenna (i.e., currently in use) will be continually changing since the motion of the user or the environment will cause the absolute signal level on each antenna to change. Both the motion of the subscriber and the motion of the environment (i.e. vehicles and pedestrians in motion, trees moving in the wind, etc.) will produce variations in the instantaneous signals seen at each antenna. In the case where the diversity apparatus is stationary, the signal could still exhibit dynamic multipath fading due to the motion around the user. Environmentally induced fluctuations in the multipath signal can generally be considered to have the same effect as signal fluctuations caused by the subscriber's movement since approximately the same receiver degradation due to signal fading would occur.

In the case of a maximal ratio combining diversity (MRCD) apparatus or an equal gain combining diversity (EGCD) apparatus, the wireless device 10 and the wireless device cradle 12 cooperate to reduce the degrading effect of the large variations in signal strength by combining the signals from the plurality of diversity branches.

As previously indicated, all or at least a portion of the circuitry necessary to support antenna reception and transmission diversity can be distributed between the wireless device 10 and cradle 12. For example, FIG. 2 illustrates the case where the receive circuitry 20, 120 is distributed between the wireless device 10 and the cradle 12. It is contemplated that circuitry in addition to, or alternative to, the receive circuitry can be distributed between the wireless device 10 and the cradle 12. For instance, with reference to FIG. 3, the processor circuitry can be completely located in the wireless device 10 such as control$_1$ 22, or completely in the cradle 12 such as control$_2$ 122, or can be distributed between the wireless device 10 and cradle 12 such as both control$_1$ 22 and control$_2$ 122.

Figure 3:
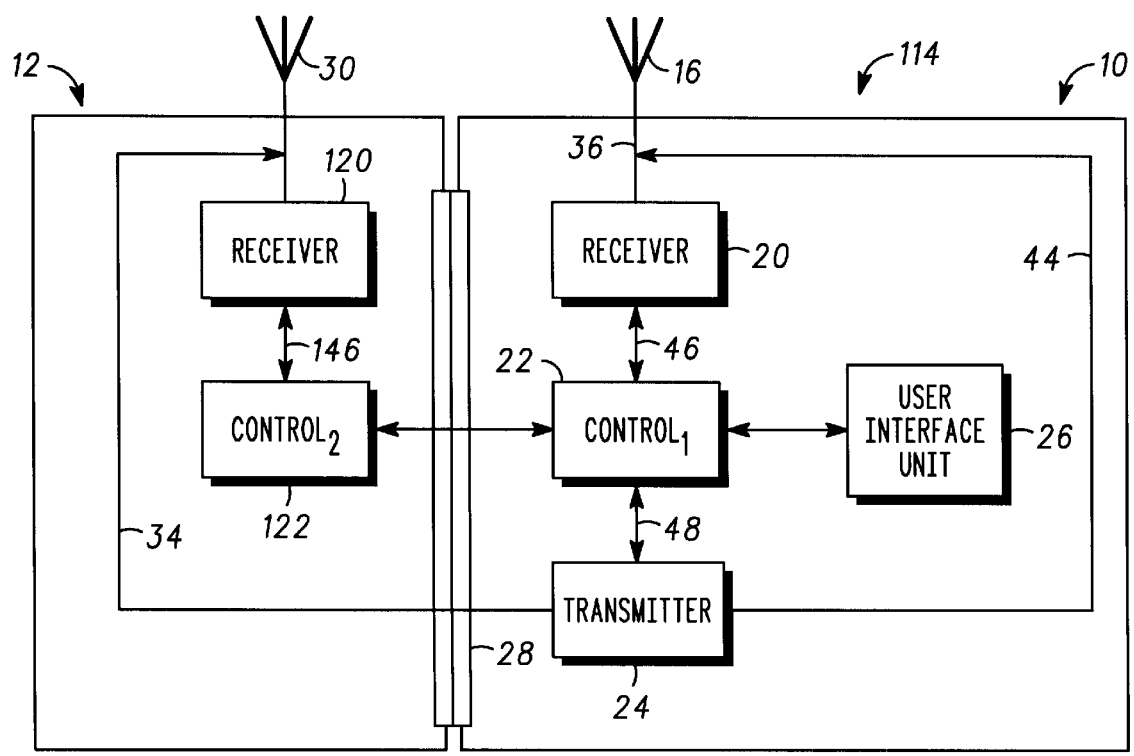
FIG. 3 is a functional block diagram of a third embodiment of a wireless device and a wireless device cradle in accordance with the present invention.

In sum, the present invention is directed to a cradle for a wireless device that provides a second antenna and associated hardware circuitry and processing and software to provide diversity operation in conjunction with a contained subscriber device. Being significantly larger than the wireless device contained therein, the separation of the antennas is greater and therefore performance is enhanced. In the embodiments of FIGS. 1, 2, and 3 the cradle provides coupling means for signal sharing between the cradle electronics and the wireless subscriber device.

The additional electronics and processing for the second branch for the receive and/or transmit directions as well as the necessary software and signal combining can be provided either in the cradle, in the wireless device, or distributed between the two. The cradle can also provide an external power connection to the wireless device for extended use, and provide an external data port to the wireless device for receiving and transmitting data across a radio system. The possible diversity functionality includes both receive diversity—switched, selected, equal gain, or max ratio as well as proposed techniques to allow the antennas to be optimized for transmit diversity use including phased array, smart, and adaptive techniques.

Lastly, it should be appreciated that when the wireless device 10 is decoupled from the cradle 12, the wireless device is adapted to completely, independently, and conventionally function as a known wireless subscriber unit within a radio system.

An advantage of the present invention is the provision of a method and apparatus that enables higher efficiency voice and/or data reception and/or transmit communications by providing a secondary diversity antenna mounted on a cradle for use in conjunction with an antenna associated with a contained subscriber device.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

I claim:
1. A diversity apparatus comprising:
   a cradle having a first antenna and a connector;
   a wireless device removeably mated to the connector and having a second antenna;
   a processor programmed to provide antenna diversity reception of a radio frequency (RF) signal using the first antenna and the second antenna when the wireless device is mated with the connector.

2. The diversity apparatus of claim 1, further comprising a receiver, the processor being programmed to selectively couple the first antenna or the second antenna to the receiver responsive to signals received by the first antenna and the second antenna.

3. The diversity apparatus of claim 2, wherein the processor is programmed to selectively couple the first antenna or the second antenna to the receiver according to at least one of a switched antenna diversity (SAD) technique and a selection diversity (SD) technique.

4. The diversity apparatus of claim 1, further comprising a first receiver coupled to the first antenna and a second receiver coupled to the second antenna, the processor being programmed to combine signals received by the first antenna and the second antenna.

5. A diversity apparatus comprising:
   a cradle having a first antenna, a connector, and a first receiver coupled to the first antenna;

a wireless device removeably mated to the connector and having a second antenna and a second receiver coupled to the second antenna;

a processor operable to provide antenna diversity reception of a radio frequency (RF) signal through at least one of the first antenna and the second antenna, the processor being programmed to combine signals received by the first antenna and the second antenna;

wherein the first receiver is associated with the cradle and the second receiver is associated with the wireless device.

6. The diversity apparatus of claim 4, wherein the processor is programmed to combine signals received by the first antenna and the second antenna according to at least one of a maximal ratio combining diversity (MRCD) technique and an equal gain combining diversity (EGCD) technique.

7. The diversity apparatus of claim 1, further comprising a transmitter adapted to transmit signals from at least one of the first antenna and the second antenna.

8. The diversity apparatus of claim 1, further comprising:

a first transceiver coupled to the wireless device for communicating, via a first communication link, with a remote base station; and an external data port coupled to the cradle to permit the wireless device to exchange data with a remote device via a second communication link, the second communication link defined by a different data exchange protocol than the first communication link.

9. A method of antenna diversity communication comprising the steps of:

providing a cradle having a first antenna, the cradle adapted to receive and communicate with a wireless device;

coupling the wireless device to the cradle so that the cradle and the wireless device are in communication with each other, the wireless device having a second antenna; and selectively coupling a first received signal representation from the first antenna and a second received signal representation from the second antenna to a receiver responsive to signal representations received by the first antenna and the second antenna.

10. The method of antenna diversity communication of claim 9, further including:

transmitting a third signal representation from at least one of the first antenna and the second antenna.

11. The method of antenna diversity communication of claim 9, wherein selectively coupling further comprises:

selectively coupling the first received signal representation from the first antenna or the second received signal representation from the second antenna to a receiver at least partially associated with the wireless device.

12. The method of antenna diversity communication of claim 9, further including:

coupling data between a data port and the wireless device, the data port being associated with the cradle.

13. A method of antenna diversity communication comprising the steps of:

providing a cradle with a first antenna;

coupling a wireless device to the cradle so that the cradle and the wireless device are in electrical communication with each other, the wireless device having a second antenna;

providing a first receiver in communication with the first antenna and a second receiver in communication with the second antenna; and combining a first signal representation from the first receiver with a second signal representation from the second receiver responsive to signal representations received by the first antenna and the second antenna.

14. The method of antenna diversity communication of claim 13, further including:

transmitting a third signal representation from at least one of the first antenna and the second antenna.

15. The method of antenna diversity communication of claim 13, further including:

coupling data between a data port and the wireless device, the data port being associated with the cradle.

16. A cradle for a wireless communication device, comprising:

a housing a connector carried on the housing adapted to communicate with the wireless communication device;

a cradle antenna carried on the housing; and a receiver positioned in the housing, the receiver coupled to the cradle antenna and with the connector and operable to provide communication signals received by the antenna to the connector for communication to the wireless communication device to enable antenna diversity communication of communication signals using the cradle antenna and an antenna in the wireless communication device.

17. A cradle for a wireless communication device, comprising:

a housing;

a connector carried on the housing adapted to communicate with the wireless communication device including a device antenna;

a cradle antenna carried by the housing; and a processor carried by the housing and coupled to the cradle antenna and the connector, the processor operable with the wireless communication device to enable antenna diversity communication of a radio frequency (RF) signals using the cradle antenna and the device antenna.

* * * * *